(12) United States Patent
Parén et al.

(10) Patent No.: US 8,048,264 B2
(45) Date of Patent: *Nov. 1, 2011

(54) COMPOSITION AND PROCESS FOR THE TREATMENT OF FIBRE MATERIAL

(75) Inventors: Aarto Parén, Kuusankoski (FI); Jonni Ahlgren, Espoo (FI); Jukka Jäkärä, Siivikkala (FI); Ilkka Renvall, Espoo (FI); Jukka Rautiainen, Espoo (FI)

(73) Assignee: Kemira Oyj, Helsinki (FI)

( * ) Notice: Subject to any disclaimer, the term of this patent is extended or adjusted under 35 U.S.C. 154(b) by 781 days.

This patent is subject to a terminal disclaimer.

(21) Appl. No.: 11/596,140

(22) PCT Filed: May 10, 2005

(86) PCT No.: PCT/FI2005/000211
§ 371 (c)(1),
(2), (4) Date: Jun. 26, 2008

(87) PCT Pub. No.: WO2005/108673
PCT Pub. Date: Nov. 17, 2005

(65) Prior Publication Data
US 2008/0264584 A1    Oct. 30, 2008

(30) Foreign Application Priority Data
May 12, 2004   (FI) ..................... 20040673

(51) Int. Cl.
*D21C 3/20*   (2006.01)
(52) U.S. Cl. ............... 162/76; 162/5; 162/78; 210/696; 210/700; 252/180; 525/205
(58) Field of Classification Search ............. 162/5, 76, 162/78; 210/698, 700; 252/180; 525/206
See application file for complete search history.

(56) References Cited

U.S. PATENT DOCUMENTS

| | | | |
|---|---|---|---|
| 4,363,699 A | | 12/1982 | DeCeuster et al. |
| 4,963,157 A | | 10/1990 | Machida et al. |
| 5,135,677 A | * | 8/1992 | Yamaguchi et al. .......... 252/180 |
| 5,658,429 A | | 8/1997 | Andersson et al. |
| 5,760,150 A | | 6/1998 | Bachus |
| 6,780,832 B1 | * | 8/2004 | Maeda et al. ................ 510/477 |
| 2008/0035287 A1 | * | 2/2008 | Lee et al. ........................ 162/72 |

FOREIGN PATENT DOCUMENTS

| | | |
|---|---|---|
| CA | 2 441 841 A1 | 3/2004 |
| EP | 0 814 193 A2 | 12/1997 |
| WO | WO 90/11403 A1 | 10/1990 |
| WO | WO 2005/080673 A2 | 9/2005 |

OTHER PUBLICATIONS

JP 60231876, Publication Date: Nov. 18, 1985, XP-002344420, Derwent Abstract, 1 page.
Search Report for Finnish Application No. 20040293, 1 page.
International Search Report, International Application No. PCT/FI2005/000113, Date of Mailing: Sep. 23, 2005, 3 pages.
The International Searching Authority, Written Opinion, International Application No. PCT/FI2005/000113, International Filing Date: Feb. 23, 2005, 5 pages.
DE 3423452 A1, Publication date: Jan. 2, 1986, Abstract, 1 page.
Search Report from Finland Patent Office (1 pg—all references cited herein).
JP 01148890; Publication Date: Jun. 12, 1989 (translation of abstract only).
JP 01266295; Publication Date: Oct. 24, 1989 (translation of abstract only).
International Search Report; International Application No. PCT/FI2005/000211 (all references cited herein).

* cited by examiner

*Primary Examiner* — Matthew Daniels
*Assistant Examiner* — Jacob Thomas Minskey
(74) *Attorney, Agent, or Firm* — Thomas, Kayden, Horstemeyer & Risley, LLP

(57) ABSTRACT

The present invention relates to a stabilizing composition comprising following components (A) a polymer having following formula

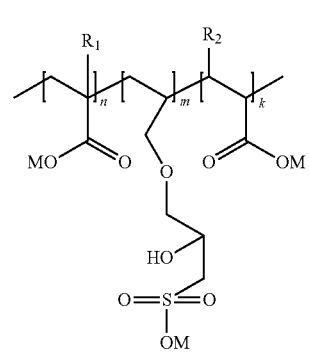

wherein $R_1$ is a hydrogen atom or an alkyl group containing 1 to 12 carbon atoms, $R_2$ is —COOM or —CH$_2$COOM, M is a hydrogen atom, an alkali metal ion, an alkaline earth metal ion, an ammonium ion or a mixture thereof, n, m and k are molar ratios of corresponding monomers, wherein n is 0 to 0.95, m is 0.05 to 0.9, and k is 0 to 0.8, and (n+m+k) equals 1, and the weight average molecular weight is between 500 and 20,000,000 g/mol, (B) a chelating agent, and (C) an alkaline earth metal compound. The invention also relates to a process for the treatment of a fiber material.

25 Claims, No Drawings

COMPOSITION AND PROCESS FOR THE TREATMENT OF FIBRE MATERIAL

FIELD OF THE INVENTION

The present invention relates to a composition comprising a polymer, a chelating agent and an alkaline earth metal compound and to a process for the treatment of a fibre material, especially a cellulosic fibre material in the presence of a polymer, a chelating agent and an alkaline earth metal compound. The composition can be used as a pretreatment in the bleaching with a peroxygen compound of chemical, mechanical, chemi-mechanical and de-inked pulps and as a pretreatment in deinking of recycled fibers and in alkaline peroxide bleaching of mechanical, chemical, chemi-mechanical and de-inked pulps. The composition can also be used in deinking of recycled fibers. The composition replaces partly or totally silicate as a stabilizer, especially in the treatment of mechanical and deinked pulps. The present invention also relates to a process for bleaching a cellulosic fibre material with a peroxide compound in an aqueous alkaline medium by using said composition.

DESCRIPTION OF THE RELATED ART

It is well-known that chelating agents can be used as pretreatment for removing harmful metal ions, i.e. generally such transition metal ions as iron and manganese before pulp is bleached with a peroxygen compound, such as hydrogen peroxide, peracetic acid or Caro's acid. In alkaline peroxide bleaching of mechanical pulps, in bleaching of de-inked pulp (DIP) made from recovered waste paper and in the deinking of recovered waste paper, water glass (alkali silicate) and a chelating agent can be added.

Since the common chelating agents such as polyaminopolycarboxylates, e.g. EDTA and DTPA and the corresponding methylenephosphonic acid derivatives of the polyamines are non-biodegradable or show a low biodegradation, there is a target to decrease the use of the common chelating agents as pretreatment agents.

Alkaline silicate solutions normally called water glass have been used in stabilizing hydrogen peroxide solutions, which are used in alkaline peroxide bleaching of mechanical pulps.

Water glass is used alone or together with peroxide in de-inking of recovered papers. Sometimes the de-inked pulp is also bleached with alkaline peroxide.

The use of water glass in alkaline peroxide bleaching of chemical pulps has been published, but the method cannot be utilized in full scale, since the silicate can cause very severe precipitation problems. Another disadvantage with water glass is that when the bleaching liquors are recycled and ultimately fed into the recovery boiler, where the so-called black liquor from the cooking process after concentration is burned, the silicate will cause severe scaling and thus decrease the heat transfer in the recovery boiler, which in worst case can cause an explosion of the recovery boiler.

If the silicates, e.g. in form of the water carry-over, will enter the paper making process, they will disturb the papermaking process, e.g. by precipitating on hot surface, causing holes in the paper reel etc.

It is known that hydrogen peroxide will decompose very rapidly in an alkaline milieu in the presence of transition metal ions. The most abundant of these ions in pulps are iron and manganese. The copper ion is also very detrimental for alkaline hydrogen peroxide, but normally it can enter the process only via used process waters.

It is also known that iron will start to precipitate already below pH 7, first in colloidal form. The formed iron hydroxides, oxyhydroxides etc are much more catalytically active than iron ions. Also manganese can, at least partly, be in precipitated form, but it has been shown that in the presence of hydrogen peroxide, manganese should be in dissolved form.

The theory of the function of water glass varies, but one theory is that water glass will deactivate the catalytic surface of iron and other heavy metal ion "precipitates". In order to avoid the detrimental effect of manganese ions, a chelating agent is often introduced into the bleaching process or the pulp is pretreated with a chelating agent. The most common chelating agents are EDTA and DTPA, which belong to the group of polyaminopolycarboxylates. The corresponding phosphonates, EDTMPA and DTPMPA can also be used, but they are much more expensive than the polyaminopolycarboxylates. They have also the disadvantage that they contain phosphorus, which is not a wanted component, when the environmental regulations are becoming stricter and stricter.

In the deinking of waste paper, water glass has also other functions, e.g. water glass improves ink detachment, it will disperse the ink and act as a buffer keeping the pH constant. Therefore a partly replacement of water glass would also be advantageous and at the same time decrease the precipitation problems connected with the use of water glass.

According to the above there is a need to partly or totally replace water glass (silicates) in alkaline peroxide bleaching processes and in pulping processes, which use water glass, e.g. in alkaline peroxide bleaching of mechanical and de-inked pulps and in de-inking of recovered paper. There have been suggestions to use phosphonates, but they should be used in quite high dosages and the phosphorus problem in the waste waters would still remain. Since the common phosphonates are non-biodegradable, there has been much studies about the adverse effect on mobilizing heavy metals, e.g. from sediments in waterways. If phosphonates would be used, the dosage of these substances should be decreased.

A pretreatment method for bleaching pulp with hydrogen peroxide in alkaline conditions in the presence of sodium silicate and adding 0.05-1% by weight (based on dry pulp) of a copolymer of 3-allyloxy-2-hydroxypropanesulfonic acid (AHPS) and (meth)acrylic acid in the pretreatment is described in the Japanese patent publication JP 1266295 (published 24 Oct. 1989).

According to the Japanese patent application JP 1148890 (published 12 Jun. 1989) the same kind of polymer in an amount of 0.05-1% by weight (based on dry pulp) has been used instead of e.g. DTPA in alkaline peroxide bleaching. In JP 1148890 the bleaching performance of a number of different AHPS-acrylic acid copolymers are shown and compared e.g. with the performance of DTPA.

In the both JP patent applications the tested amounts are very big, since normally the chelating agents are used in an amount of 0.5 to 2 kg per ton pulp as 100% sodium salt.

Finnish unpublished patent application FI-20040293 discloses a process for bleaching a fibre material with an alkaline peroxide solution in the presence of a chelating agent and a copolymer of 3-allyloxy-2-hydroxypropanesulfonic acid (AHPS) with (meth)acrylic acid, maleic acid or itaconic acid. This patent application also discloses a composition comprising said copolymer and the chelating agent for use as a stabilizer in alkaline peroxide bleaching for replacing partly or totally water glass.

SUMMARY OF THE PRESENT INVENTION

According to the present invention it has now surprisingly been found that by using a copolymer of AHPS and an unsaturated carboxylic acid, such as acrylic acid, methacrylic acid, maleic acid or itaconic acid, together with a chelating agent and an alkaline earth metal compound, such as magnesium sulphate, either mixed together or added separately, a very good bleaching performance can be achieved and a total replacement of water glass can be achieved, if necessary from the pulping and paper making point of view. Surprisingly, the combination of the copolymer, the chelating agent and the alkaline earth metal compound showed an improved effect as compared to the effect of the combination of the copolymer and the chelating agent or the combination of the chelating agent and the alkaline earth metal compound. Test results unexpectedly showed a clear synergistic effect.

The combination of the three components, i.e. the copolymer, the chelating agent and the alkaline earth metal compound, can very effectively be used as a stabilizer in bleaching of a chemical, mechanical or de-inked pulp with a peroxygen compound, such as hydrogen peroxide, peracetic acid or Caro's acid. The present invention makes it possible to partially or totally replace water glass in bleaching and deinking processes by using the combination of the three components.

The present invention provides a process for treatment of a fibre material comprising the step of contacting the fibre material in an aqueous medium with a chelating agent, the above copolymer and an alkaline earth metal compound. The copolymer, the chelating agent and the alkaline earth metal compound can be added separately or preferably as a ready made mixture (composition).

The present invention also relates to a composition comprising the copolymer, the chelating agent and the alkaline earth metal compound.

The composition and process according to the invention can be used as a pretreatment of all kind of pulps, chemical pulps, mechanical, chemi-mechanical pulps and deinked pulps, which are bleached with alkaline peroxide.

The composition and process according to the invention can also be used in the bleaching of all kind of pulps, chemical pulps, mechanical, chemi-mechanical pulps and deinked pulps by using hydrogen peroxide as the bleaching agent.

The composition and process are also suitable in deinking of recycled pulps, in which water glass and hydrogen peroxide are commonly used.

The composition can also be used in sodium dithionite bleaching of mechanical and de-inked pulps.

The alkaline peroxide bleaching process for mechanical, chemi-mechanical and de-inked pulps according to the invention can be practiced as a single stage of bleaching or in a two-stage process, where the pre-bleached pulp is entering the second stage. Any consistency can be used, but it is most preferable to use medium consistency in the first stage and high consistency in the second stage.

If needed, the bleaching can be preceded by a pretreatment with a chelating agent or preceded by a pretreatment according to the invention in order to reduce the amount of transition metals entering the bleaching process.

In the de-inking process the composition of the present invention can be used in repulping or in a disperger or in a kneader which possibly is followed by a soaking tower whereto hydrogen peroxide can be fed. In the de-inking process the composition of the present invention can also be used in a separate bleaching stage or any process stage where hydrogen peroxide is present.

The composition, either as ready made mixture or as combination of the three components, can be used as total or partial replacement in those processes, where water glass are commonly used.

The theory how the three components will work together is not clear, since the polymer itself cannot stabilize very well alkaline hydrogen peroxide solutions and also gives in general poor bleaching performance. Nor does the alkaline earth metal compound stabilize alkaline hydrogen peroxide solutions very well especially in the presence of manganese. The chelating agents stabilize quite well the above mentioned alkaline peroxide, but cannot give a good bleaching result. The common chelating agents mentioned above, will bind the soluble manganese ions in the alkaline peroxide solutions, but since iron is then in solid form, either colloidal or in precipitated form, chelating agents cannot any more bind the solid compounds. The same is valid for the solid forms of manganese compounds. The polymer somehow binds to the solid surfaces or inactivates the catalytic effect of the solid particles. Thus a combined effect will be obtained. The common chelating agents cannot, when used alone, give a good bleaching performance, i.e. for chemical pulps, small viscosity loss and high brightness gain and a sufficient amount of residual peroxide, and for mechanical pulps and deinked pulps high brightness gain and a sufficient amount of residual peroxide, which indicates that peroxide has mainly been consumed for bleaching and not for decomposition processes. Therefore there must be some synergetic effect between the three components used according to the invention.

DETAILED DESCRIPTION OF THE INVENTION

In a first aspect of the present invention there is provided a stabilizing composition comprising following components
(A) a polymer having the following formula

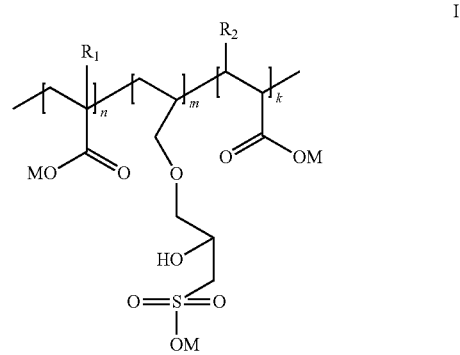

wherein
$R_1$ is a hydrogen atom or an alkyl group containing 1 to 12 carbon atoms,
$R_2$ is —COOM or —CH$_2$COOM,
M is a hydrogen atom, an alkali metal ion, an alkaline earth metal ion, an ammonium ion or a mixture thereof,
n, m and k are molar ratios of corresponding monomers, wherein n is 0 to 0.95, m is 0.05 to 0.9, and k is 0 to 0.8, and (n+m+k) equals 1, and
the weight average molecular weight is between 500 and 20,000,000 g/mol,
(B) a chelating agent, and
(C) an alkaline earth metal compound.

In a second aspect of the present invention there is provided a process for the treatment of a fibre material comprising the step of contacting the fibre material in an aqueous medium with following components (A) a polymer having the following general formula

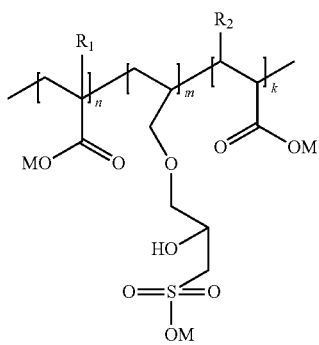

wherein
$R_1$ is a hydrogen atom or an alkyl group containing 1 to 12 carbon atoms,
$R_2$ is —COOM or —$CH_2$COOM,
M is a hydrogen atom, an alkali metal ion, an alkaline earth metal ion, an ammonium ion or a mixture thereof,
n, m and k are molar ratios of corresponding monomers, wherein n is 0 to 0.95, m is 0.05 to 0.9, and k is 0 to 0.8, and (n+m+k) equals 1, and
the weight average molecular weight is between 500 and 20,000,000 g/mol,
(B) a chelating agent, and
(C) an alkaline earth metal compound.

The composition of the present invention can be used as a stabilizer in the bleaching of a fibre material in an aqueous medium or as a stabilizer in the deinking of a recycled fibre material.

The above alkali metal ion is preferably sodium or potassium ion, and the alkaline earth metal ion is preferably magnesium ion.

A preferred comonomer with AHPS is acrylic acid ($R_1$=H), methacrylic acid ($R_1$=$CH_3$), maleic acid ($R_2$=COOM) or itaconic acid ($R_2$=$CH_2$COOM). When k is 0 in formula I the preferred comonomer is acrylic acid or methacrylic acid, and when n is 0 the preferred comonomer is maleic acid or itaconic acid. When both k and n are not 0 the preferred comonomers with AHPS are (meth)acrylic acid and maleic acid or itaconic acid.

The monomers are randomly distributed along the polymer chain of formula I, and preferably n is 0.4 to 0.9, m is 0.1 to 0.5, and k is 0 to 0.5.

If the system in pretreatment or in alkaline peroxide bleaching contains high amount of calcium ions, as is the case, when so-called white water from papermaking process is circulated to the pulping and/or bleaching operations, it is advantageous to use maleic acid or itaconic acid (k>0) as one of the comonomers in order to increase the calcium binding ability of the polymer. It is preferable in normal cases that the polymer only contains AHPS and a monomer containing one carboxylic acid, such as acrylic acid, since a copolymer comprising multiple monomers is usually more difficult to produce.

The weight average molecular weight of the copolymer of formula I should be between 500 and 20,000,000 g/mol, preferably between 1,000 and 1,000,000 g/mol and most preferably between 2,000 g/mol and 500,000 g/mol.

If the weight average molecular weight is lower than about 500 g/mol, the efficiency of the polymer becomes too low. If the average molecular weight is higher than 20,000,000 g/mol, handling and dosage become a problem due to high viscosity of the polymer solution.

To increase the molecular weight of the copolymer and/or to enhance the efficiency of the copolymer, a cross linker may be used in an amount of 0 to 20% by mole, preferably 0 to 10% by mole, of the total monomer content. Suitable cross linkers are, for example methylenebisacrylamide, ethylene glycol divinyl ether, di(ethylene glycol) divinyl ether, tri(ethylene glycol) divinyl ether and vinyl or allyl terminated polymers, but are not limited to these.

To decrease molecular weight of the copolymer and/or to enhance the efficiency of the copolymer, a chain transfer agent may be used in an amount of 0 to 20% by mole, preferably 0 to 10% by mole, of the total monomer content. Suitable chain transfer agents are, for example thiols (e.g. butylmercaptan) and alcohols (e.g. isopropanol), but are not limited to these.

The chelating agent (B) to be used together with the copolymer (A) of formula I may be a chelating having formula II, III or IV below.

A preferred chelating agent is a compound having the following general formula

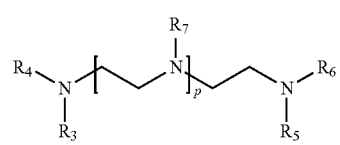

wherein
p is 0 or an integer of 1 to 10,
$R_3$, $R_4$, $R_5$, $R_6$ and $R_7$ are independently a hydrogen atom or an alkyl chain having 1 to 6 carbon atoms and containing one or more active chelating ligands, such as carboxylic, phosphonic or hydroxyl group(s) or a salt thereof.

The alkyl chain is preferably methylene —$CH_2$— or ethylene —$CH_2CH_2$—.

In formula II $R_3$, $R_4$, $R_6$ and $R_7$ preferably represent the same group.

Examples of chelating agents according to the above formula II are polyaminopolycarboxylic acids and polyaminopolymethylenephosphonic acids.

The polyaminopolycarboxylic acids can be produced by the conventional route from the polyamine and formaldehyde and sodium cyanide or hydrocyanic acid. The more suitable route for small scale production is to use a haloacetic acid, especially monochloroacetic acid as a reactant.

Preferred polyaminopolycarboxylic acids are:
DTPA: p=1, $R_3$=$R_4$=$R_5$=$R_6$=$R_7$=—$CH_2$COOH
TTHA: p=2, $R_3$=$R_4$=$R_5$=$R_6$=$R_7$=—$CH_2$COOH
EDTA: p=0, $R_3$=$R_4$=$R_5$=$R_6$=—$CH_2$COOH
HEDTA: p=0, $R_3$=$R_4$=$R_5$=—$CH_2$COOH, $R_5$=—$CH_2CH_2$OH
EDDS: p=0, $R_3$=$R_5$=H, $R_4$=$R_6$=—CH(COOH)$CH_2$COOH (ethylenediaminedisuccinic acid)

The polyaminopolymethylenephosphonic acids are made conventionally from the corresponding polyamine, formaldehyde and phosphonic acid. With the higher amines a full substitution with acetic acid groups or methylenphosphonic acid groups will become more and more difficult. These chelating agents will also perform well in the composition but an incomplete substitution will make the chelating agents more prone for decomposition by hydrogen peroxide.

Preferred polyaminopolymethylenephosphonic acids are:
DTPMPA: p=1, $R_3=R_4=R_5=R_6=R_7=$—$CH_2POO_2H_2$
TTHMPA: p=2, $R_3=R_4=R_5=R_6=R_7=$—$CH_2POO_2H_2$
EDTMPA: p=0, $R_3=R_4=R_5=R_6=$—$CH_2POO_2H_2$ Another preferred chelating agent is a compound having the following general formula

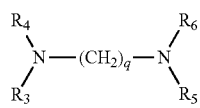

III wherein
q is an integer of 3 to 10,
$R_3$, $R_4$, $R_5$ and $R_6$ are independently a hydrogen atom or an alkyl chain having 1 to 6 carbon atoms and containing one or more active chelating ligands, such as carboxylic, phosphonic or hydroxyl group(s) or a salt thereof.

The alkyl chain is preferably methylene —$CH_2$— or ethylene —$CH_2CH_2$—.

In formula III $R_3$, $R_4$ and $R_6$ preferably represent the same group.

Examples of chelating agents according to the above formula III are the commercially available hexamethylenediamine tetra(acetic acid) (q=6) and tetramethylenediamine tetra(methylenephosphonic acid) (q=4) having the following formulae.

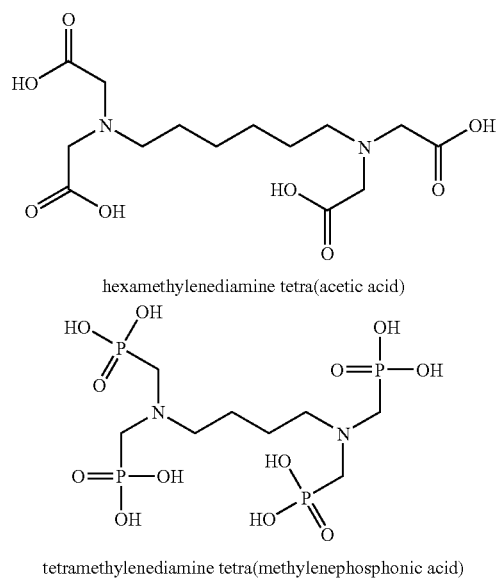

Yet another preferred chelating agent is a compound having the following general formula

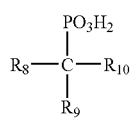

IV wherein
$R_8$ is a hydrogen atom, an alkyl group containing 1 to 6 carbon atoms or an alkyl chain having 1 to 6 carbon atoms and containing a carboxylic, phosphonic or hydroxyl group, $R_9$ is a hydrogen atom, hydroxyl group, phosphonic group, carboxylic group or alkyl chain having 1 to 6 carbon atoms and containing one or two carboxylic groups, and $R_{10}$ is a hydrogen atom, hydroxyl group, carboxylic group, alkyl group containing 1 to 6 carbon atoms or alkyl chain having 1 to 6 carbon atoms and containing a carboxylic group, or a salt thereof.

The alkyl chain is preferably methylene —$CH_2$— or ethylene —$CH_2CH_2$—.

An example of the non-nitrogen containing chelating agents according to the above formula IV is 1-hydroxyethylidene-1,1-diphosphonic acid (HEDP).

A further preferred chelating agent is a compound having the following general formula

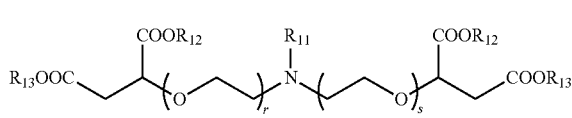

V wherein $R_{11}$ is
a hydrogen atom
an alkyl chain containing 1-30 carbon atoms,
an alkyl chain containing 1-30 carbon atoms and 1-10 carboxylic acid groups attached to said chain, or alkali or alkaline earth metal salt thereof,
an alkyl chain containing 1-30 carbon atoms and 1-10 carboxylic acid esters attached to said chain,
a (poly)ethoxylated hydrocarbon chain containing 1-20 ethoxyl groups, or
a carboxylic acid amide containing 1-30 carbon atoms, where N—$R_{11}$ bond is an amide bond, $R_{12}$ and $R_{13}$ are: hydrogen, an alkali metal ion or an alkaline earth metal ion or an alkyl group containing 1-30 carbon atoms, r is 0 or 1, and s is 0 or 1.

Preferred N-bis- or tris-[(1,2-dicarboxy-ethoxy)ethyl] amines of formula V are shown in the following

A

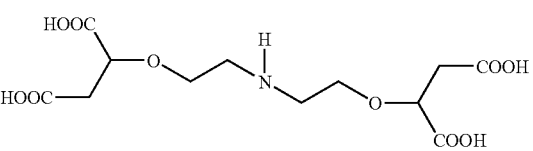

B

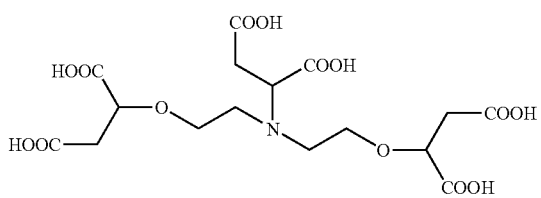

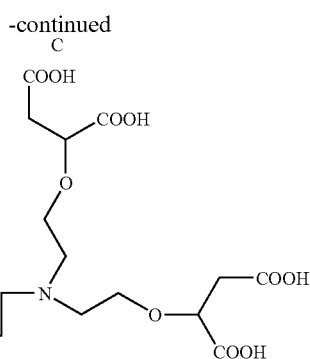

A = N-bis[(1,2-dikarboxy-ethoxy)-ethyl]-amine
B = N-bis[(1,2-dikarboxy-ethoxy)-ethyl]-aspartic (AES)
C = N-tris[(1,2-dikarboxy-ethoxy)-ethyl]-amine A preferred N-bis-(1,2-dicarboxy-ethyl)amine of formula V is iminodisuccinic acid (ISA) having the following formula

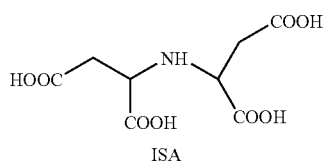

ISA

Though the formulas of the chelating agents are depicted above as acids, they are commercially normally sold as their alkali salts, mainly as their sodium salts and the formulas given above have to be understood as including both the free acids and their salts.

The alkaline earth metal compound (C) to be used together with the copolymer (A) of formula I and the chelating agent (B) is preferably a magnesium or a calcium compound or a mixture thereof, more preferably a magnesium compound. Especially preferred are water-soluble magnesium or calcium salts, such as magnesium or calcium chloride, sulphate or acetate or a mixture thereof, most preferably magnesium sulphate. According to the present invention the alkaline earth metal can also exist as a complex with the chelating agent, especially an Mg-chelating agent complex, such as Mg-DTPA complex. The form of the alkaline earth metal in the stabilizer mixture has no effect here.

The polymer and the chelating agent can be added separately or as a composition mixture. The weight ratio of the polymer (calculated as solids) to the chelating agent (calculated as 100% chelating agent as sodium salt) is preferably from 1:4 to 4:1, more preferably from 1:3 to 3:1.

The alkaline earth metal compound can be added separately or as a composition mixture with the polymer or the chelating agent or both.

The total amount of the polymer (as solids), the chelating agent (as 100% sodium salt) and the alkaline earth metal compound (as alkaline earth metal) added separately or as a mixture, is preferably 0.05-10 kg per ton of dry fibre material, more preferably 0.1-5 kg per ton of dry fibre material, and most preferably 0.2 to 4 kg per ton of dry fibre material.

The amount of the polymer is preferably 0.05-5 kg per ton dry fibre material, more preferably 0.1-2 kg per ton dry fibre material calculated as solids.

The amount of the chelating agent is preferably 0.05-5 kg per ton dry fibre material, more preferably 0.1-2 kg per ton dry fibre material calculated as 100% sodium salt.

The amount of the alkaline earth metal compound is preferably 0.05-5 kg per ton dry fibre material, more preferably 0.1-2 kg per ton dry fibre material calculated as alkaline earth metal.

Preferably the three components (A), (B) and (C) are present in following weight ratios 10 to 60:20 to 70:10 to 50, more preferably 15 to 55:25 to 65:15:45, most preferably 20 to 50:30 to 60:20 to 40 calculated as active substance.

The fibre material is preferably a cellulosic fibre material, especially a chemical, mechanical, chemi-mechanical or deinked pulp. The cellulosic fibre material can also be any regenerated cellulose material, such as viscose, or flax or cotton.

If a composition mixture is made according to the invention, the normal content of active materials in the mixture can be at least 10%, preferably at least 15%, and more preferably at least 20% by weight, but also more diluted solutions can be used in the application process.

In one embodiment of the process of the present invention the treatment comprises bleaching the fibre material with an alkaline peroxide solution in the presence of the chelating agent, the polymer and the alkaline earth metal compound.

The bleaching of chemical pulp can be carried out at temperatures of from 50° C. to 150° C. and at all practical consistencies. The residence time in the bleaching can vary within a wide range, from 30 to 240 minutes, preferably from 45 to 180 minutes and most preferably from 60 to 120 minutes. The residence time will also depend on the temperature used in the bleaching.

The stages can also be reinforced with oxygen, the abbreviation of stages depicted in the professional literature as EOP, Eop, PO or OP.

The peroxide bleaching of mechanical pulps with the process according to the invention can comprise all kind of mechanical pulps, e.g. stone groundwood pulp (SGW), refiner mechanical pulp (RMP), pressure groundwood (PGW), thermo-mechanical pulp (TMP), but also chemically treated high-yield pulps such as chemithermomechanical pulp (CTMP). The invention is also useful in bleaching of deinked pulps. Deinked pulp can be made using mixed office waste (MOW), newsprint (ONP), magazines (OMG) etc. as raw material and the composition of the present invention can be used in any process stage where peroxide is used. The invention can also be practiced in refiner bleaching of mechanical pulps and in alkaline peroxide mechanical pulp (APMP), in which wood chips are impregnated with alkaline peroxide solution before refining. In these applications the invention is very advantageous, since the biggest obstacle to use hydrogen peroxide in these applications has been that water glass cannot be used, since the sodium silicate will e.g. fasten to the refiner plates and thus making the process unpractical.

The residence time in the bleaching can vary within a wide range, from 30 to 240 minutes, preferably from 45 to 180 minutes and most preferably from 60 to 120 minutes. The residence time will also depend on the temperature used in the bleaching.

The composition according to the invention can be used as a mixture or the ingredients can be added separately.

The bleaching of mechanical pulps can be carried out at a temperature of from 30° C. to 90° C., preferably at a temperature of from 50° C. to 90° C. The bleaching can be carried out at a consistency of choice, but it is most preferably to carry out the bleaching at a high consistency, i.e. about 30% or higher. Bleaching can also be carried in two stages with a dewatering stage between the stages. The stages can be carried out at a consistency of choice, but it is most preferably to use medium consistency in the first stage and a high consistency in the second stage. This makes it possible to remove the detrimental substances efficiently.

The bleaching stage can be preceded by a chelating agent stage or a pretreatment according to the invention, discussed in more detail below, and dewatering and thus improve the bleaching performance. In the chelating agent stage any of the above defined chelating agents can be used.

The ratio between the alkali and hydrogen peroxide can vary in a wide range, depending on raw materials and degree of bleaching. Also alternative alkali sources, like sodium carbonate, can be utilized. The use of sodium carbonate is especially preferably to use, at least as a partial replacement of sodium hydroxide, when wastepaper is deinked with the total replacement of water glass using the composition according to the invention. The necessary buffer capacity can be ensured in this way.

In another embodiment of the process of the present invention the treatment comprises pretreating the fibre material in the aqueous medium comprising the chelating agent, the polymer and the alkaline earth metal compound.

The pretreatment according to the invention can be utilized for all kind of chemical and mechanical pulps.

The pretreatment can be followed by a bleaching with a peroxygen compound optionally in the presence of the chelating agent, the polymer and the alkaline earth metal compound. The peroxygen compound can be hydrogen peroxide, peracetic acid or Caro's acid.

The pretreatment of chemical pulps can also precede such stages, in which another peroxygen chemical than hydrogen peroxide is used, e.g. a peracetic acid, Caro's acid etc. stage. If the stage is followed by an alkaline stage comprising the use of hydrogen peroxide, the treatment can also carried out after the above mentioned peroxygen stage. Depending on the raw material and the process the treatment can also be carried out only after the mentioned peroxygen stage.

The consistency of this pretreatment is preferably around 10% in order to ensure an efficient metal removal. The pH is preferably from 3 to 7, more preferably from 4 to 6.5 and most preferably from 4.5 to 6. The pretreatment can be carried at any temperature, but it is preferably carried at the same temperature as the bleaching stage, but however below 100° C.

In yet another embodiment of the process of the present invention the treatment comprises de-inking recycled fibre material in the aqueous medium containing the chelating agent, the polymer and the alkaline earth metal compound.

In the de-inking process the polymer composition according to the invention can be used in repulping of wastepaper or in a disperger or in a kneader which possibly is followed by a soaking tower whereto hydrogen peroxide can be fed. In the de-inking process the polymer composition of the present invention can also be used in a separate bleaching stage or any process stage where hydrogen peroxide is present.

The pH in the alkaline bleaching, including the de-inking in the presence of hydrogen peroxide, is from 7 to 13, preferably from 7 to 12, and more preferably from 7 to 11.

The present invention is illustrated by following examples, which will not limit the scope of the invention.

In this specification the percentages are % by weight unless otherwise specified. In the tables below the amounts of chemicals given as kg refer to kg per ton dry pulp.

Example 1

Polymerization of AHPS and Acrylic Acid

Preparation of poly(acrylic acid-co-3-allyloxy-2-hydroxypropanesulfonic acid, sodium salt) aqueous solution; a 65:35 (mol) polymer.

A four-necked glass reactor of 0.25 liters, equipped with a heating/cooling jacket, an overhead stirrer, a thermometer, a reflux condenser, a gas inlet and 2 reagent pumps, was charged with 3-allyloxy-2-hydroxypropanesulfonic acid, sodium salt 40% aqueous solution (95.5 g). The solution was degassed with nitrogen and temperature raised to 85° C. While the solution was stirred, there were pumped at constant rate acrylic acid 50% aqueous solution (46.8 g) within 3 hours, and sodium persulfate 1.3% aqueous solution (47.6 g) within 3 hours and 30 minutes. The addition of the reagent solutions was started simultaneously. After addition of the sodium persulfate solution the reaction mixture was stirred for additional 1 hour and 30 minutes, while maintaining the temperature at 85° C. The reactor was cooled, and slightly yellow and viscous aqueous copolymer solution was obtained.

A sample of the solution was treated with excess of concentrated hydrochloric acid solution to convert the corresponding sodium salts to free acids. Residual 3-allyloxy-2-hydroxypropanesulfonic acid content of the thus obtained solution was determined by gas chromatography, and was approximated to be 2.0% by weight. This refers to 90% conversion of the 3-allyloxy-2-hydroxypropanesulfonic acid, sodium salt monomer.

A sample of the first copolymer solution was neutralized with sodium hydroxide to pH about 10. The molecular weight of the thus obtained copolymer was determined by gel permeation chromatography against poly(acrylic acid, sodium salt) standards. Number and weight average molecular weights were approximated to be 9,000 g/mol and 48,000 g/mol, respectively.

In order to make a preliminary test about the suitability of the stabilizers for alkaline peroxide solutions, stability tests were carried out, i.e. following the decomposition of hydrogen peroxide as a function of time. Since the results very nicely followed the first order kinetics, the results are given as half life time figures. If a very low half life time is obtained, e.g. under some tens of minutes, the product is not suitable for alkaline peroxide bleaching. If the half life time is more than 100 minutes, the product may be suitable in alkaline peroxide bleaching without sodium silicate, but the result does not guarantee a good bleaching performance. Since the transition metal ions, especially in wood abundantly present iron and manganese, will decompose alkaline hydrogen peroxide, the tests were carried out in the presence of these ions.

Following Examples 2 to 7 relate to stability tests of alkaline peroxide solutions and Examples 8 and 9 relate to laboratory peroxide bleaching tests.

Example 2

A solution containing Fe and Mn (as sulphates) and a stabilizer composition comprising one or more of following components: polymer (PAHPS-AA prepared in Example 1), Mg sulphate, and DTPA was prepared and pH adjusted to 10. The total amount of stabilizer in each test was 100 mg/l (calculated as active substance). The temperature was raised to 50° C. The solution was stirred and hydrogen peroxide added in a concentration of 3 g/l. The pH was readjusted to 10, and the hydrogen peroxide concentration measured as a function of time (determined by standard iodometric method). The half life time of the hydrogen peroxide was calculated according to $1^{st}$ order reaction rate. Following stabilizer compositions were tested:

| | Amount, mg/l (calculated as active substance) |
|---|---|
| DTPA | 100 |
| PAHPS-AA | 100 |
| PAHPS-AA + DTPA | 50 + 50 |
| MgSO$_4$ | 100 |
| DTPA + MgSO$_4$ | 80 + 20 |
| PAHPS-AA + DTPA + MgSO$_4$ | 40 + 40 + 20 |

The results are shown in the table below.

| | Molar shares | | | | | $t_{1/2}$, min (1$^{st}$ order reaction rate) | | | | | |
|---|---|---|---|---|---|---|---|---|---|---|---|
| | Fe, ppm | Mn, ppm | Fe, mol-% | Mn, mol-% | [Fe + Mn], µmol/l | No stabilizer | DTPA | AHPS | PAHPS-AA + DTPA | DTPA + Mg | PAHPS-AA + DTPA + Mg |
| 1. | 4.0 | 0.0 | 100 | 0 | 72.2 | 892 | 45 | 61 | 8 | 880 | 260 | 1055 |
| 2. | 3.0 | 1.0 | 75 | 25 | 72.2 | 16 | 57 | 8 | 224 | 35 | 254 | 1124 |
| 3. | 2.5 | 1.5 | 62 | 38 | 72.2 | 9 | 69 | 9 | 227 | 19 | 285 | 861 |
| 4. | 2.0 | 2.0 | 50 | 50 | 72.2 | 5 | 84 | 9 | 221 | 17 | 348 | 1043 |
| 5. | 1.5 | 2.5 | 37 | 63 | 72.2 | 2 | 94 | 9 | 225 | 11 | 517 | 1267 |
| 6. | 1.0 | 3.0 | 24 | 76 | 72.2 | 2 | 194 | 9 | 226 | 10 | 698 | 934 |
| 7. | 0.0 | 4.0 | 0 | 100 | 72.2 | 48 | 5317 | 8 | 228 | 10 | 51 | 620 |

The results clearly show the synergistic effect of the combination of these three chemicals, i.e. PAHPS-AA, DTPA and Mg. Since iron and manganese are the most abundant transition metals, and usually they both are present in mechanical pulps, it is very important to have good stabilizing performance in the presence of these both metals.

Example 3

In this example some additional stabilizer compositions were tested. The tests were carried out in the same way as in Example 2. Following stabilizer compositions were tested:

| | Amount, mg/l (calculated as active substance) |
|---|---|
| ISA | 100 |
| AES | 100 |
| DTPMPA | 100 |
| ISA + PAHPS-AA + MgSO$_4$ | 20 + 60 + 20 |
| AES + MgSO$_4$ | 80 + 20 |

-continued

| | Amount, mg/l (calculated as active substance) |
|---|---|
| PAHPS-AA + DTPA + DTPMPA + MgSO$_4$ | 50 + 15 + 15 + 20 |
| PAHPS-AA + AES + MgSO$_4$ | 40 + 40 + 20 |

The results are shown in the table below.

| | Molar shares | | | | | $t_{1/2}$, min (1$^{st}$ order reaction rate) | | | |
|---|---|---|---|---|---|---|---|---|---|
| | Fe, ppm | Mn, ppm | Fe, mol-% | Mn, mol-% | [Fe + Mn], µmol/l | No stabilizer | ISA | AES | DTPMPA |
| 1. | 4.0 | 0.0 | 100 | 0 | 72.2 | 892 | 376 | 14001 | 376 |
| 2. | 3.0 | 1.0 | 75 | 25 | 72.2 | 16 | 21 | 222 | 81 |
| 3. | 2.5 | 1.5 | 62 | 38 | 72.2 | 9 | 9 | 274 | 64 |
| 4. | 2.0 | 2.0 | 50 | 50 | 72.2 | 5 | 9 | 322 | 60 |
| 5. | 1.5 | 2.5 | 37 | 63 | 72.2 | 2 | 9 | 386 | 71 |
| 6. | 1.0 | 3.0 | 24 | 76 | 72.2 | 2 | 9 | 549 | 164 |
| 7. | 0.0 | 4.0 | 0 | 100 | 72.2 | 48 | 592 | 242 | 1962 |

| | $t_{1/2}$, min (1$^{st}$ order reaction rate) | | | |
|---|---|---|---|---|
| | ISA + PAHPS-AA + Mg | AES + Mg | PAHPS-AA + DTPA + DTPMPA + Mg | PAHPS-AA + AES + Mg |
| 1. | 1089 | 587 | 2992 | 8455 |
| 2. | 1027 | 1255 | 2594 | 1145 |
| 3. | 745 | 513 | 2099 | 827 |
| 4. | 671 | 199 | 1487 | 614 |
| 5. | 601 | 31 | 876 | 338 |
| 6. | 482 | 28 | 549 | 333 |
| 7. | 36 | 29 | 260 | 264 |

The results show that very good results were obtained by the stabilizer compositions of the present invention

Example 4

The effect of the composition of the stabilizer is shown in the table below. The tests were carried out in the same way as in Example 2.

| Fe, ppm | Mn, ppm | PAHPS-AA, % | DTPA, % | Mg, % | Stabilizer, mg/l | t ½, min |
|---|---|---|---|---|---|---|
| 1 | 3 | 80 | 0 | 20 | 100 | 682 |
| 1 | 3 | 60 | 20 | 20 | 100 | 955 |
| 1 | 3 | 50 | 30 | 20 | 100 | 992 |
| 1 | 3 | 40 | 40 | 20 | 100 | 1443 |
| 1 | 3 | 30 | 50 | 20 | 100 | 1979 |
| 1 | 3 | 20 | 60 | 20 | 100 | 2294 |
| 1 | 3 | 10 | 70 | 20 | 100 | 734 |
| 1 | 3 | 0 | 80 | 20 | 100 | 607 |

As can be seen from the table, the combination of the polymer, the complexing agent and the alkaline earth metal compound has better performance than the combination of the polymer and the alkaline earth metal compound and the combination of the complexing agent and the alkaline earth metal compound.

Example 5

In this example, the effect of the concentration of alkaline earth metal is demonstrated. The tests were carried out in the same way as in Example 2.

| Fe, ppm | Mn, ppm | PAHPS-AA, % | DTPA, % | Mg, % | Stabilizer, mg/l | t ½, min |
|---|---|---|---|---|---|---|
| 1 | 3 | 50 | 50 | 0 | 100 | 226 |
| 1 | 3 | 45 | 45 | 10 | 100 | 736 |
| 1 | 3 | 40 | 40 | 20 | 100 | 1443 |
| 1 | 3 | 35 | 35 | 30 | 100 | 1001 |
| 1 | 3 | 25 | 25 | 50 | 100 | 211 |
| 1 | 3 | 15 | 15 | 70 | 100 | 29 |
| 2 | 2 | 45 | 45 | 10 | 100 | 425 |
| 2 | 2 | 40 | 40 | 20 | 100 | 2376 |
| 2 | 2 | 35 | 35 | 30 | 100 | 1164 |
| 2 | 2 | 30 | 30 | 40 | 100 | 738 |

As can be seen from this example, there exists a certain optimal composition that gives the best stability.

Example 6

In this example, the effect of the total concentration of the stabilizers is demonstrated. The tests were carried out in the same way as in Example 2.

| Fe, ppm | Mn, ppm | PAHPS-AA, mg/l | DTPA, mg/l | Mg, mg/l | Stabilizer, mg/l | t ½, min |
|---|---|---|---|---|---|---|
| 1 | 3 | 0 | 0 | 0 | 0 | 10 |
| 1 | 3 | 20 | 20 | 10 | 50 | 922 |
| 1 | 3 | 30 | 30 | 15 | 75 | 1514 |
| 1 | 3 | 40 | 40 | 20 | 100 | 2294 |
| 1 | 3 | 60 | 60 | 30 | 150 | 2993 |

Example 7

This example shows how the optimal PAHPS-AA:DTPA ratio changes when iron and manganese concentration changes. The tests were carried out in the same way as in Example 2.

| Fe, ppm | Mn, ppm | PAHPS-AA, % | DTPA, % | Mg, % | Stabilizer, mg/l | t ½, min |
|---|---|---|---|---|---|---|
| 2 | 2 | 20 | 60 | 20 | 100 | 1307 |
| 2 | 2 | 40 | 40 | 20 | 100 | 2376 |
| 1 | 3 | 20 | 60 | 20 | 100 | 2294 |
| 1 | 3 | 40 | 40 | 20 | 100 | 1443 |

Example 8

An industrial TMP (spruce, *picea abies*) pulp was bleached in laboratory using different stabilizers. The pulp contained 6 ppm Fe, 8 ppm Mn, 730 ppm Ca, and <2 ppm Cu. The PAHPS-AA used in this test was prepared in Example 1. DTPA used in this test was of commercial grade containing the normal side products of the process. The reaction temperature was 70° C., reaction time 120 minutes, consistency 12%. Chemical charges were: NaOH 35 kg/ton pulp, $H_2O_2$ 45 kg/ton pulp, stabilizer dosages are shown in table below (calculated as active substance). Initial pH in the bleaching was 10.4-10.2.

| | | | | | | |
|---|---|---|---|---|---|---|
| PAHPS-AA, kg | 1.3 | 0.8 | 0.6 | 0.4 | 0 | 0 |
| $Na_5$DTPA, kg | 1.3 | 0.8 | 0.6 | 0.4 | 0 | 0 |
| Mg, kg | 0.63 | 0.42 | 0.28 | 0.19 | 0 | 0 |
| Stabilzer, as 100%, kg | 3.13 | 2.10 | 1.41 | 0.94 | 0 | 0 |
| Waterglass, kg/ton pulp | 0 | 0 | 0 | 0 | 0 | 25 |
| Residual H2O2 | 17.5 | 18.7 | 15.6 | 16 | 2 | 17.3 |
| Brightness | 77.8 | 78.6 | 77.7 | 77.7 | 75 | 77.6 |
| According to the invention? | Yes | Yes | Yes | Yes | No | No |

The results show, that silicate can be efficiently replaced by the stabilizer according to this invention.

Example 9

In this example, the effect of pH in bleaching is demonstrated. The pulp used in this test is the same as in example 8. The detailed reaction conditions and chemical dosages are presented in the table below.

| no | 107 | 108 | 102 | 103 | 104 | 105 | 106 | 113 | 114 | 115 | 116 |
|---|---|---|---|---|---|---|---|---|---|---|---|
| test | P | P | P | P | P | P | P | P | P | P | P |
| T, C. | 70 | 70 | 70 | 70 | 70 | 70 | 70 | 70 | 70 | 70 | 70 |
| t, min | 120 | 120 | 120 | 120 | 120 | 120 | 120 | 120 | 120 | 120 | 120 |
| Cs, % | 12 | 12 | 12 | 12 | 12 | 12 | 12 | 12 | 12 | 12 | 12 |
| Initial pH | 10.3 | 10.4 | 10.5 | 10.3 | 10.1 | 10 | 10.1 | 10.4 | 10.3 | 10.1 | 10 |
| Final pH | 9.7 | 9.7 | 9.4 | 9 | 8.5 | 8.5 | 8.5 | 9.8 | 9.7 | 9.5 | 9 |
| H2O2, kg | 45 | 45 | 45 | 45 | 45 | 45 | 45 | 45 | 45 | 45 | 45 |
| NaOH, kg | 38 | 38 | 35 | 30 | 25 | 25 | 25 | 38 | 35 | 30 | 25 |
| Waterglass, kg | 0 | 0 | 0 | 0 | 0 | 0 | 0 | 25 | 25 | 25 | 25 |
| DTPA, kg | 2.5 | 1.25 | 2.5 | 2.5 | 2.5 | 1.75 | 1 | 0 | 0 | 0 | 0 |
| PAHPS-AA, kg | 2.5 | 1.25 | 2.5 | 2.5 | 2.5 | 1.75 | 1 | 0 | 0 | 0 | 0 |
| MgSO4, kg/t | 3.1 | 1.6 | 3.1 | 3.1 | 3.1 | 2.2 | 1.3 | 0 | 0 | 0 | 0 |
| Residual H2O2, kg | 17.4 | 16.8 | 21.8 | 27.2 | 31.5 | 30.2 | 27.8 | 16.2 | 17.3 | 28 | 32 |
| Residual NaOH, kg | 3.4 | 4 | 2.4 | 1.2 | 0.6 | 0.7 | 0.7 | 8.6 | 7.1 | 4.8 | 2.3 |
| Brightness, % ISO | 77 | 77.3 | 77.8 | 77.2 | 76.7 | 76.7 | 76.3 | 77.5 | 77.6 | 77.4 | 77.1 |
| According to the invention? | Yes | Yes | Yes | Yes | Yes | Yes | Yes | No | No | No | No | pH is a very significant factor in bleaching. Higher alkalinity leads to lower stability of peroxide. On the other hand higher alkalinity improves bleaching performance by increasing perhydroxyl anion concentration. This example shows that the stabilizer according to this invention gives bleaching result equal to sodium silicate even with high alkali charge.

The invention claimed is:

1. A stabilizing composition comprising following components
(A) a copolymer having the following formula

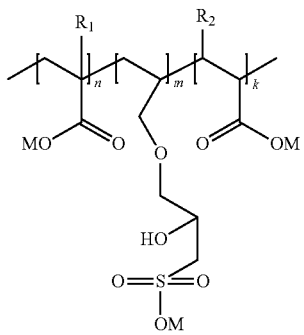

I wherein
$R_1$ is a hydrogen atom or an alkyl group containing 1 to 12 carbon atoms,
$R_2$ is —COOM or —CH$_2$COOM,
M is a hydrogen atom, an alkali metal ion, an alkaline earth metal ion, an ammonium ion or a mixture thereof,
n, m and k are molar ratios of corresponding monomers, wherein n is 0 to 0.95, m is 0.05 to 0.9, and k is 0 to 0.8, and (n+m+k) equals 1, and
the weight average molecular weight is between 500 and 20,000,000 g/mol,
(B) a chelating agent, and
(C) an alkaline earth metal compound,
wherein the three components (A), (B) and (C) are present in the weight ratio of (A):(B):(C) of 10 to 60:20 to 70:10 to 50.

2. The composition according to claim 1 wherein in formula I n is 0.4 to 0.9, m is 0.1 to 0.5, and k is 0 to 0.5.

3. The composition according to claim 1 wherein the weight average molecular weight of the copolymer is between 1,000 and 1,000,000 g/mol.

4. The composition according to claim 1 wherein the three components (A), (B) and (C) are present in the weight ratio of (A):(B):(C) of 15 to 55:25 to 65:15 to 45 calculated as active substance.

5. The composition according to claim 1 wherein the copolymer is a copolymer of 3-allyloxy-2-hydroxypropanesulfonic acid and at least one of the monomers acrylic acid, methacrylic acid, maleic acid and itaconic acid or a salt thereof.

6. The composition according to claim 1 wherein the chelating agent is a compound having the following general formula

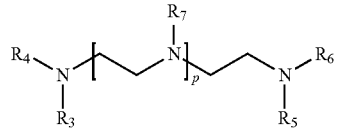

II wherein
p is 0 or an integer of 1 to 10,
$R_3$, $R_4$, $R_5$, $R_6$ and $R_7$ are independently a hydrogen atom or an alkyl chain having 1 to 6 carbon atoms and containing one or more active chelating ligands.

7. The composition according to claim 1 wherein the chelating agent is a compound having the following general formula

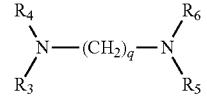

III wherein
q is an integer of 3 to 10,
$R_3$, $R_4$, $R_5$ and $R_6$ are independently a hydrogen atom or an alkyl chain having 1 to 6 carbon atoms and containing one or more active chelating ligands.

8. The composition according to claim 1 wherein the chelating agent is a compound having the following general formula $$R_8-\underset{\underset{R_9}{|}}{\overset{\overset{PO_3H_2}{|}}{C}}-R_{10} \qquad IV$$

wherein $R_8$ is a hydrogen atom, an alkyl group containing 1 to 6 carbon atoms or an alkyl chain having 1 to 6 carbon atoms and containing a carboxylic, phosphonic or hydroxyl group, $R_9$ is a hydrogen atom, hydroxyl group, phosphonic group, carboxylic group or alkyl chain having 1 to 6 carbon atoms and containing one or two carboxylic groups, and $R_{10}$ is a hydrogen atom, hydroxyl group, carboxylic group, alkyl group containing 1 to 6 carbon atoms or alkyl chain having 1 to 6 carbon atoms and containing a carboxylic group, or a salt thereof.

9. The composition according to claim 1 wherein the chelating agent is a compound having the following general formula $$R_{13}OOC \underset{}{\overset{COOR_{12}}{\diagdown}} {\Big(}O{\Big)}_r N{\Big(}O{\Big)}_s \underset{}{\overset{COOR_{12}}{\diagup}} COOR_{13} \qquad V$$

wherein $R_{11}$ is a hydrogen atom, an alkyl chain containing 1-30 carbon atoms, an alkyl chain containing 1-30 carbon atoms and 1-10 carboxylic acid groups attached to said chain, or alkali or alkaline earth metal salt thereof, an alkyl chain containing 1-30 carbon atoms and 1-10 carboxylic acid esters attached to said chain, a (poly) ethoxylated hydrocarbon chain containing 1-20 ethoxyl groups, or a carboxylic acid amide containing 1-30 carbon atoms, where N—$R_{11}$ bond is an amide bond, $R_{12}$ and $R_{13}$ are: hydrogen, an alkali metal ion or an alkaline earth metal ion or an alkyl group containing 1-30 carbon atoms, r is 0 or 1, and s is 0 or 1.

10. The composition according to claim 1 wherein the alkaline earth metal compound is a water-soluble magnesium or calcium salt.

11. A process for the treatment of a fibre material comprising the step of contacting the fibre material in an aqueous medium with following components, wherein the fibre material is a cellulosic fibre material selected from the group consisting of chemical, mechanical, and chemi-mechanical pulps and recycled fibre materials:

(A) a copolymer having the following general formula

I wherein $R_1$ is a hydrogen atom or an alkyl group containing 1 to 12 carbon atoms, $R_2$ is —COOM or —CH$_2$COOM, M is a hydrogen atom, an alkali metal ion, an alkaline earth metal ion, an ammonium ion or a mixture thereof, n, m and k are molar ratios of corresponding monomers, wherein n is 0 to 0.95, m is 0.05 to 0.9, and k is 0 to 0.8, and (n+m+k) equals 1, and the weight average molecular weight is between 500 and 20,000,000 g/mol, (B) a chelating agent, and (C) an alkaline earth metal compound, wherein the three components (A), (B) and (C) are present in the weight ratio of (A):(B):(C) of 10 to 60:20 to 70:10 to 50.

12. The process according to claim 11 wherein the three components (A), (B) and (C) are introduced as a mixture or the three components (A), (B) and (C) are introduced separately.

13. The process according to claim 11 wherein the treatment comprises bleaching the fibre material with an alkaline peroxide solution in the presence of the three components (A), (B) and (C).

14. The process according to claim 13 wherein the bleaching is preceded by a treatment with a chelating agent.

15. The process according to claim 11 wherein the treatment comprises pretreating the fibre material in the aqueous medium comprising the three components (A), (B) and (C).

16. The process according to claim 15 wherein the pH of the aqueous medium in the pretreatment is between 3 and 7.

17. The process according to claim 15 wherein the pretreatment is followed by a bleaching with a peroxygen compound optionally in the presence of the three components (A), (B) and (C).

18. The process according to claim 17 wherein the peroxygen compound is hydrogen peroxide, peracetic acid or Caro's acid.

19. The process according to claim 11 wherein the fibre material comprises a recycled fibre material, and wherein the treatment comprises de-inking the recycled fibre material in the aqueous medium comprising the three components (A), (B) and (C).

20. The process according to claim 11 wherein in formula I n is 0.4 to 0.9, m is 0.1 to 0.5, and k is 0 to 0.5.

21. The process according to claim 11 wherein the weight average molecular weight of the copolymer is between 1,000 and 1,000,000 g/mol.

22. The process according to claim 11 wherein the total amount of the three components in the treatment is 0.05 to 10 kg per ton of dry fibre material.

23. The process according to claim 11 wherein the three components (A), (B) and (C) are present in the weight ratio of (A):(B):(C) of 15 to 55:25 to 65:15 to 45.

24. The process according to claim 11 wherein the polymer is a copolymer of 3-allyloxy-2-hydroxypropanesulfonic acid and at least one of the monomers acrylic acid, methacrylic acid, maleic acid and itaconic acid or a salt thereof.

25. The process according to claim 11 wherein the chelating agent comprises a compound having the following general formula

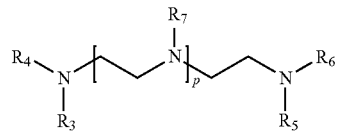

II wherein p is 0 or an integer of 1 to 10, $R_3, R_4, R_5, R_6$ and $R_7$ are independently a hydrogen atom or an alkyl chain having 1 to 6 carbon atoms and optionally one or more additional chelating ligands, and the alkaline earth metal compound is a water-soluble magnesium or calcium salt of the following general formula

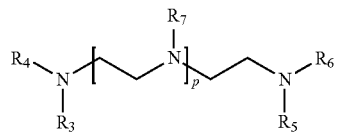

II wherein p is 0 or an integer of 1 to 10, $R_3, R_4, R_5, R_6$ and $R_7$ are independently a hydrogen atom or an alkyl chain having 1 to 6 carbon atoms and containing one or more active chelating ligands.

* * * * *